United States Patent [19]

Ho

[11] 3,721,765

[45] March 20, 1973

[54] TELEPHONE ANSWERING MACHINE

[75] Inventor: Charles W. Ho, San Francisco, Calif.

[73] Assignees: Dictran International Corporation, San Francisco, Calif.; Victor Company of Japan, Limited, Tokyo, Japan; part interest to each

[22] Filed: June 7, 1971

[21] Appl. No.: 150,428

[52] U.S. Cl. .............................. 179/6 R, 179/100.2 Z

[51] Int. Cl. .............................. H04m 1/64, G11b 23/04

[58] Field of Search ........... 179/6 R, 6 AC, 6 C, 6 E, 179/100.2 Z; 274/4 D, 11 D

[56] References Cited

UNITED STATES PATENTS

| | | | |
|---|---|---|---|
| 3,410,470 | 11/1968 | Metzner | 179/100.2 Z |
| 3,492,427 | 1/1970 | Foster | 179/6 AC |
| 3,127,474 | 3/1964 | Waldman | 179/6 R |
| 3,578,335 | 5/1971 | Ban | 179/100.2 Z |
| 3,376,390 | 4/1968 | Hashimoto | 179/6 R |
| 3,524,936 | 8/1970 | Hill | 179/6 E |
| 3,586,779 | 6/1971 | Chernack | 179/6 R |

FOREIGN PATENTS OR APPLICATIONS

| | | | |
|---|---|---|---|
| 1,058,253 | 2/1967 | Great Britain | 179/6 R |

*Primary Examiner*—Raymond F. Cardillo, Jr.
*Attorney*—Owen, Wickersham & Erickson

[57] ABSTRACT

An automatic telephone answering machine for use in combination with a conventional telephone utilizes a first magnetic tape cassette to store a prerecorded message and a second tape cassette to record a caller's message. The two tape cassettes are driven by transport means which operates to drive the first tape cassette with a prerecorded message in response to receipt of an incoming call and which automatically shifts to drive the second cassette for recording the caller's message when the prerecorded message is completed. The machine provides for counting each incoming message received, an automatic cutoff circuit that stops the second recording cassette after a predetermined period of silence and for recording any desired message on the first tape cassette.

4 Claims, 7 Drawing Figures

CHARLES W. HO
INVENTOR

BY Owen, Wickersham & Erickson
ATTORNEYS

TELEPHONE ANSWERING MACHINE

This invention relates to telephone answering devices, and particularly those that will automatically sense the presence of a signal, such as "ringing potential" in a telephone line, and then perform several functions which enable the caller of an unattended telephone to receive a message from the called but absent party and also to leave a message when desired.

Automatic telephone answering devices of the aforesaid type as heretofore devised had various problems and disadvantages which limited their use and effectiveness. Among these were excessive cost both for the device itself and for its installation and maintenance. Other problems included a lack of reliability as well as ease and versatility in operation. One object of the present invention is to provide an improved automatic telephone answering machine that overcomes such disadvantages and problems.

Another object of my invention is to provide a telephone answering machine that will function properly when installed as part of a telephone system having line cutoff functions terminated by either the "-called party" or by the "calling party," thereby making it universally usable in modern telephone communication systems.

Another object of my invention is to provide a telephone answering device which utilizes two separate recording means in the form of standard type endless tape cassettes. Thus, the machine owner who contemplates being absent from his telephone can readily record any desired message on a first recording cassette and easily insert it for use into the machine. The recorded callers' messages which are recorded on the second cassette can be retained for future reference by its easy removal and replacement.

Still another object of my invention is to provide a telephone answering machine that is durable, reliable and relatively free from maintenance problems. This objective is achieved in part by a unique system wherein a single drive motor is utilized in combination with a shiftable power train to drive both the first and second recording means at different times.

It is also an object of the present invention to provide an automatic telephone answering system that will count and display the number of telephone messages received by the machine during a given period of time.

Yet another object is to provide a telephone answering machine that will automatically cut off after a predetermined period of silence (e.g., 10 seconds) so that the amount of recording tape utilized will be conserved and the machine will have a large message storage capacity.

Other objects, advantages and features of my invention will become apparent from the following detailed specification presented in conjunction with the accompanying drawings, wherein.

FIG. *5a* is an electronic circuit diagram of approximately one-third of the total system;

FIG. *5b* is an electronic circuit diagram of approximately the middle one-third of the total system; and FIG. *5c* is an electronic circuit diagram of approximately the final one-third of the total system.

Note: By combining FIGS. *5a*, *5b* and *5c* in a joined together relationship, one may view the entire electronic circuit diagram of the machine.

Figure 1:
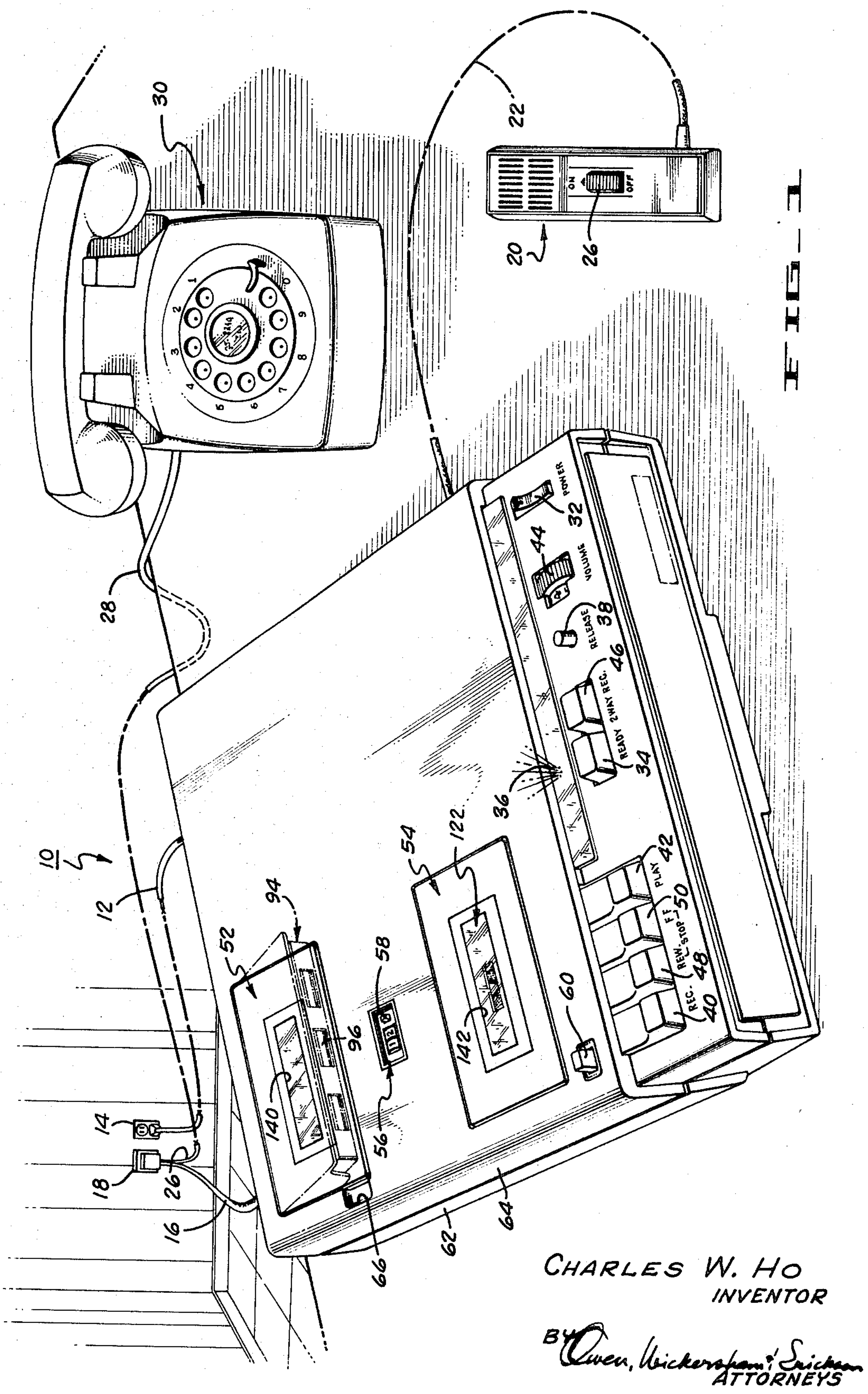
FIG. 1 is a view in perspective showing a telephone answering machine according to my invention as it appears when installed for use.

Referring now to FIG. 1 a telephone answering machine 10 embodying the principles of my invention is shown in a typical installation with its electrical power cord 12 inserted into an electrical power outlet 14. A telephone communications cord 16 also extends from the back portion of the machine 10 into a typical telephone company wall terminal 18. Attached to the machine is a manually operated microphone 20 having a cable 22 connected into a microphone input 24 located on its right hand side. This microphone is provided with a control button 26, whose function will be described later. A second telephone communications cord 28 connected at the wall terminal box 18, terminating at a standard dial telephone instrument 30 completes the system installation. Use of this telephone will not be affected by the machine 10 unless the machine is "set" in the proper functional mode.

To operate the machine of FIG. 1, a user, in preparation for leaving his telephone unattended, will press a power switch 32 of the machine 10, which allows power to flow to it. Further, he will press a ready button 34 which remains in a latched down position, causing a prerecorded message to be played one time. This also lights an indicator lamp 36 which illuminates the area directly ahead of the button 34. The user then depresses a record key 40 and a play key 24 simultaneously, and these keys remain in a latched down position. The machine 10 is now in the correct mode to function as a telephone answering machine during the absence of the user. The machine 10 is additionally provided with a volume level control dial 44, a two-way record key 46, a re-wind key 48 and a fast-forward key 50.

As also shown in FIG. 1, my machine 10 is comprised of two cassette tape receptacles 52 and 54, a message counter 56 having a re-set button 58 and a cassette release button 60. The electro-mechanical and electronic components of my machine are housed in a high impact plastic case comprised of a bottom housing portion 62 and a top cover housing 64, and suitable fasteners are employed to secure them to the bottom housing 62. A top cover housing 64 which cooperates with the bottom housing is placed thereover in a snap-on manner and is provided with various openings which surround the control elements and the cassette tape receptacles, providing physical and visual access thereto. The cassette receptacle 54 is released to its open position through depression of the button 60, raising it to about a 15° inclined angle such as shown in phantom at the cassette receptacle 52. The cassette receptacle 52 may be raised to its open position (as indicated in phantom lines) by inserting a finger into a recess 66 in the cover 64. Both receptacles 52 and 54 are provided with latching hold down means, and spring loaded opening means (not shown), such that they will remain in either the raised or closed positions.

Figure 2:
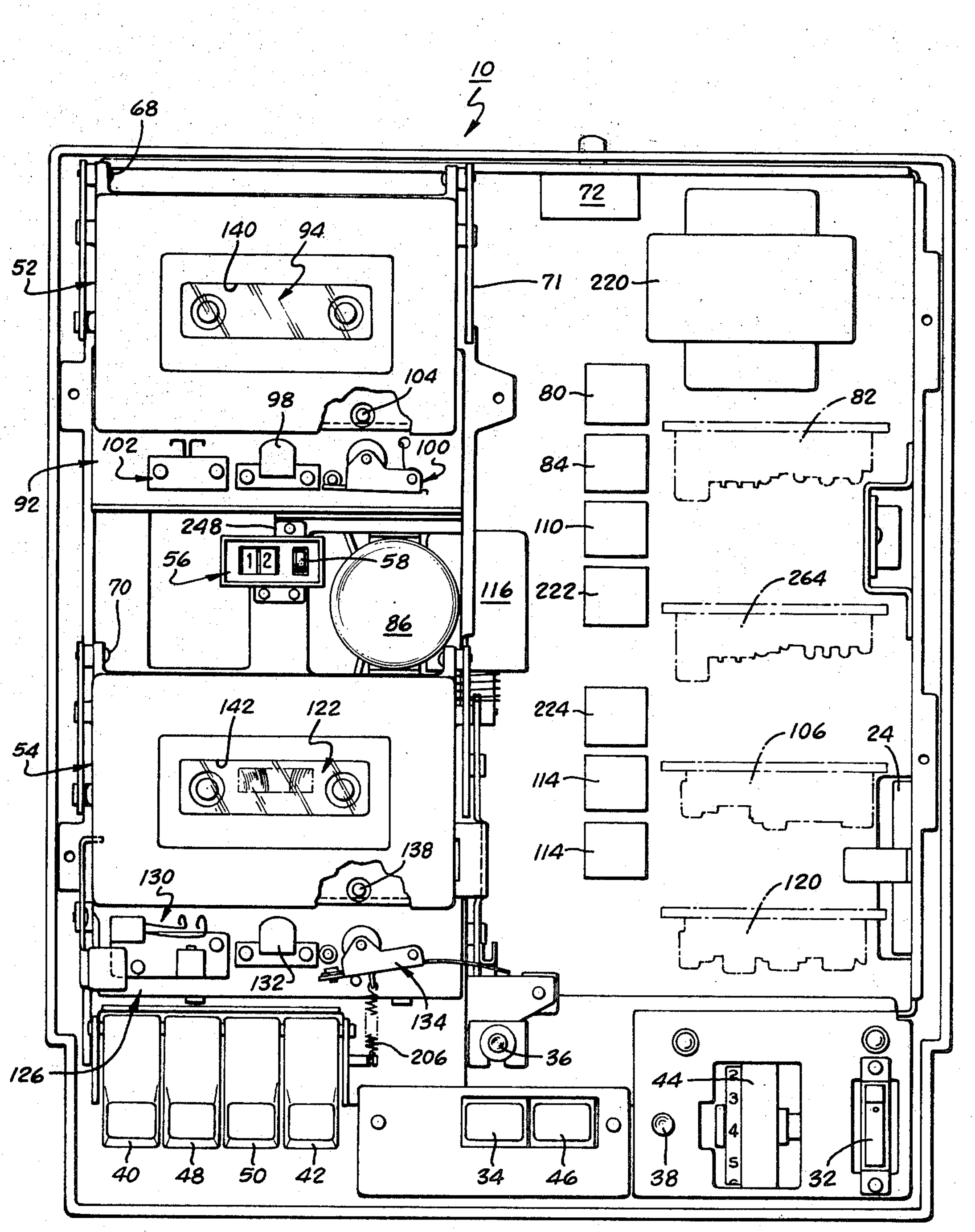
FIG. 2 is a top plan view of the machine of FIG. 1 showing the major mechanical elements with cover removed and parts broken away for clarity and illustrating the general location and outline of certain internal electronic components in phantom and dotted lines.

As shown in FIG. 2, the machine 10 has its cover removed to indicate its various internal elements. For example, the cassette receptacles 52 and 54 are shown hinged at pivotal bearing members 68 and 70, respectively, which are mounted on an internal chassis or frame 71. FIG. 2 further reveals the location of a three-position monitor switch, a drive motor, various indicator lamps, a power transformer, a plurality of relays and in phantom lines the location of four major electronic printed circuit boards of the plug-in variety. All of these elements will later be described and identified by reference numbers.

Figure 3:
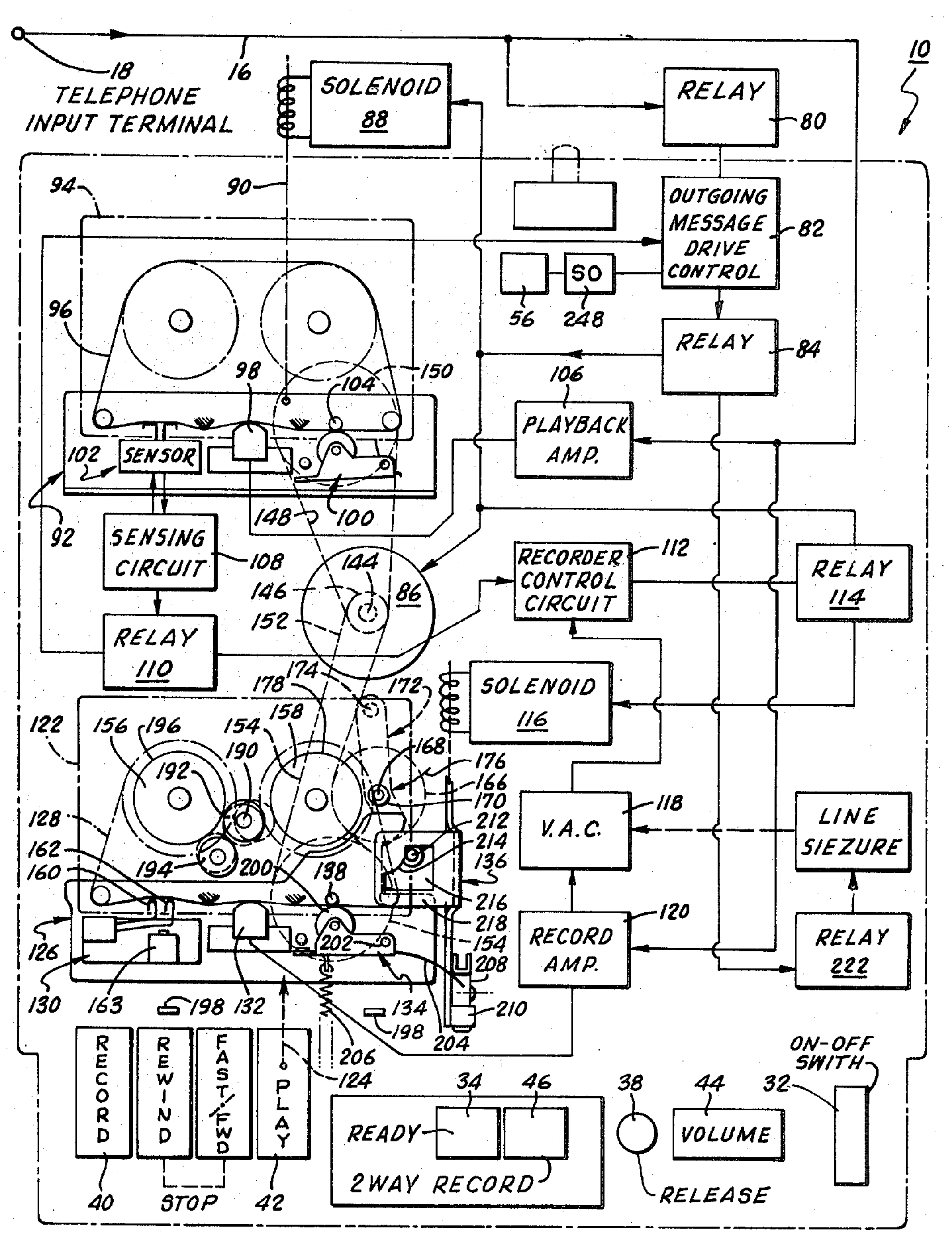
FIG. 3 is a top plan and partially schematic view of the machine of FIG. 1 with cover housing removed, showing a system functional flow block diagram interfaces with the general electro-mechanical elements of my telephone answering machine.

With reference to FIG. 3, an incoming signal or ringing pulse transmitted over the telephone line 16 from the input terminal 18 is supplied directly to a relay 80 that activates an outgoing message drive control 82 and which will be described in detail later. The output of the control 82 operates a second relay 84 which directs power to a single direction, constant speed drive motor 86, causing it to start. Power from this relay 84 also energizes a solenoid 88, which through a mechanical linkage symbolically shown as 90, moves laterally a slidable head and pinch-roller support plate assembly 92. This assembly includes a fixed position play-back head 98, a spring biased pinch-roller assembly 100 and a fixed position shorting sensor contact 102. A first recording tape cassette 94 which may be of the standard type commonly used in various recording devices and having a recording tape 96, fits within the cassette receptacle 52 located near the support plate assembly 92. This cassette 94 is shown in phantom lines in the raised position of the receptacle 52 in FIG. 2 and also in phantom lines in FIG. 3. The recording tape medium 96 of cassette 94 carries a prerecorded message, and, at one desired location, a metallic shorting strip about 1 inch long (not shown). When the cassette 94 is in its receptacle and the receptacle is in its down or closed position a rotatable capstan 104 extends upwardly within the cassette adjacent the tape 96. Now, when the solenoid 88 is actuated through linkage 90, it pulls the plate assembly 92 laterally a predetermined distance to a fixed stop. This causes the element 98, 100 and 102 to engage the recording tape 96. The pinch-roller assembly 100 presses the tape against the rotating capstan 104 causing it to move and simultaneously a prerecorded message from tape 96 is now derived from the head 98 and applied through a playback amplifier 106 over the telephone line 16 to the caller. At message end, the metallic sensing strip on the tape 96 moves into shorting position with the contacts of sensor 102, thereby initiating a transfer signal through a sensing circuit 108. A signal from this circuit 108 enters a relay 110 which directs it to a recorder control circuit 112 and from there to a relay 114 and a solenoid 116. The caller, having received the prerecorded message of the first tape 96 may now record a message which will be stored for the called party, and the relay 110 initiates a transfer action which sets up this recording mode. A signal from the relay 110 actuates a recorder control circuit 112, which in turn supplies current to actuate a relay 114. This current flows through the relay 114 to a solenoid 116 and to the motor 86.

With the record key 40 (see FIG. 1), and the play key 42 having been previously depressed, the record mode of the message record and a playback cassette tape unit 122 is set. Depression of the record key 40 establishes the conditions for the electronic functions and depression of the play key 42 sets up the required mechanical functions through linkage designated symbolically by a link 124. The linkage 124 carries forward a slidable head and pinch-roller support plate assembly 126, carrying its elements into engagement with the tape 128 of the cassette tape unit 122. The support plate assembly 126 carries an electro-mechanical sensing switch 130, a magnetic record playback head 132 and a pinch-roller assembly 134.

In order that the caller on the telephone line may record a message for the called party, it is merely necessary for the relay 114 to actuate the solenoid 116. As solenoid 116 energizes, a mechanical linkage assembly 136 moves to cause the pinch-roller assembly 134 to engage the tape 128 and a rotating capstan 138 of the tape cassette 122. Instantly, the tape 128 begins to move and a go-ahead signal of approximately one second in duration, in the form of a 1,400 $H_z$ tone, is transmitted to the caller on the line. The caller without hesitation may now record a voice message to the called party. If the caller ceases to speak for an interval longer than ten seconds, the recording process is stopped by a functional operation of the machine as will be explained later; however, for as long as the caller continues to speak, recording of his voice continues. Using standard, conventional tape cassettes, the record time capacity of the cassette unit 122 may be as long as 60 minutes.

The tape drive system will now be described with reference to FIGS. 2 and 4 to facilitate an understanding thereof in order to complete the total descriptive sequence of operation and other novel, functional features of my machine 10. The constant speed motor 86 is fixedly mounted to a suitable support bracket and has a drive shaft 144 that extends downwardly through the support bracket to which is attached a double grooved drive pulley 146. On the underside of the machine, an endless loop drive belt 148 is disposed between the pulley 146 and a first capstan drive fly wheel 150. This wheel 150 is fixed to the base end of the bearing mounted capstan shaft 104, and thus supplies constant speed and rotation to the capstan 104 for the cassette tape unit 94. A second drive belt 152 is disposed between drive pulley 146 and a second capstan drive fly wheel 154. This wheel 154 is mounted to the base end of the second capstan drive shaft 138, thereby rotating it at a constant speed. The capstans 104 and 138 therefore continuously rotate when the motor 86 is running. Thus, to advance the tape 96 across the head 98 and other associated elements, it is merely necessary to engage the pinch-roller assembly 100 into pinch relationship with the tape 96 and capstan 104. On the other hand, the tape 128 of cassette 122 is stored in the reel to reel fashion and must, under the record mode, be moved entirely from its supply reel 156 along a predetermined path to its take-up reel 158, in either a constant "slow" speed of approximately 1½ I.P.S. or at a substantially faster speed referred to as "fast forward." Conversely, it is also necessary to return all of the tape 128 to the supply reel 156 from the take-up reel 158. This reel to reel movement is "sensed" by appropriate means now described.

The sensor 130 is comprised of two leaf spring electrical members 160 and 162, and a contact 163. The springs 160 and 162 are constructed of suitable conductive material such as beryllium copper, in that they must be flexible. When the springs 160 and 162 are biased into contact with the tape 128, as shown in FIG. 3, the spring 162 is urged into a closer, but not actually, a touching relationship with the contact 163. The "end of tape travel" is sensed, during either direction of tape travel, as the tape 128 is permanently attached at each end to supply reel 156 and take-up reel 158. When all of the tape 128 is removed from (for example) the supply reel, a shock is seen by the tape as it becomes taut, flattens out into a straight linear path from an otherwise curved path, causing the springs 160 and 162 to flex or bend. This action brings the spring 162 into closure with the contact 163, completing a circuit to activate a solenoid 258. This solenoid actuates a hold-down release for the control buttons 34 and 46 and thereby switches off the automatic operating mode and stops movement of the tape 128. The sensor 130 in this manner stops the tape motion in all modes. Further, this sensor is so designed and constructed that it functions as does sensor 102 of the cassette 94, in an electrical fashion, so that the cassette 94 may be removed from the receptacle 52 and placed into the receptacle 54 to receive a new recorded message.

Appropriate drive facilities, previously described, provide means to move the tape 128 in all reel to reel mode requirements by the single drive motor 86 through the belt 152. Referring now to FIG. 3, the drive motor 86 through pulley 146 gives rotation to the capstan shafts 104 and 138 through belts 148 and 152. The capstans 104 and 138 are made of suitable material to have a certain degree of yield or elasticity required for the function intended. Disposed along the path of belt 152 is a pulley 166 affixed to a shaft 168, extending through a bearing mount (not shown) to a rubber tired wheel 170 (see FIG. 3), said pulley 166, shaft 168 and wheel 170 being carried by a slightly movable arm 172 pivotally supported by a pin 174. The arm 172 is constantly spring biased in the direction of an arrow 176 and will therefore (when permitted) cause the wheel 170 to frictionally engage the periphery of a tape take-up reel 178. In this mode, the take-up reel will store the tape under constant bias as it passes along its path from the capstan 138, assuming the tape 128 is being moved under a record or play-back mode.

Further, disposed in close relationship to an enlarged periphery 180 of the flywheel 154 (see also FIG. 4) is a spring biased arm assembly 182 having two degrees of motion as indicated by arrows 184 and 186. Carried by an arm 182 is a rubber tired wheel 188 affixed to a shaft 190 which is bearing mounted (not shown) and extends through the arm 182. The arm assembly 184 may be moved in either the direction 184 or 186 as shown and when such event occurs, the wheel 188 will be moved into spring biased frictional contact with the periphery 180 of the flywheel 154. Under this condition, the shaft 190 rotates at a "fast" speed, imparting rotary motion to a friction drive wheel 192 (again see FIG. 3). The wheel 192 being an integral part of the arm assembly 182 will frictionally engage the takeup reel 158 at drive surface 178 when shifted to the right (as shown in FIG. 3) or will frictionally engage a spring biased, movable idler drive wheel 194 when the wheel 192 is moved downward. The biased idler wheel 194 comes into frictional engagement with the periphery 196 of supply reel 156, and simultaneously, the drive wheel 192 frictionally engages the idler wheel 194 and through it imparts rotary motion in a reverse direction to the take-up reel 156. This condition brings about a fast reverse or re-wind mode.

As previously mentioned, the arm assembly 174 will under certain conditions, cause the wheel 170 to frictionally engage the periphery of the take-up reel surface 178 to facilitate the storage of tape upon the take-up reel. This function will now be described. As shown, mechanism is provided in my machine to facilitate the movement of recording tape as required within the confines of both the first and second tape cassettes 94 and 122. In FIG. 3, as a matter of descriptive convenience, the support plate 92 of tape cassette 94 and the support plate 126 of tape cassette 122 are each shown in the totally engaged or operative position mode. The support plate assembly 126 and its associated elements are moved and held in the record/play-back mode by the mechanical linkage designated 124 located between the plate 126 and "-play" control key 42. When allowed to retract, the plate 126 comes to rest against a pair of upwardly extending metal stops 198. Carried by the plate 126 is the sensor 130, a record/play-back head 132, a pinch roller assembly 134, having a pinch roller 200, pivotally mounted at 202, carrying a tape contact bias leaf spring 204, and a pinch roller return spring 206 (see also FIG. 2). When these elements as described are positioned in the engaged record/play-back mode (FIG. 3), it is then necessary to energize the solenoid 116 in order that tape may be moved, for record or playback, as follows. Upon energization of solenoid 116, the slide-assembly 136 moves vertically and this motion rocks a pivotally mounted bell crank 208 through contact of a laterally formed tab 210. The uppermost end of the bell crank 208 imparts a clockwise spring biased motion to the pinch roller assembly 134, thereby carrying it into the position shown and engaging the pinch roller 200 with the tape 128 and capstan 138. Since the capstan 138 is rotating, the tape 128 immediately begins to move from the supply reel over the head and onto the take-up reel. Simultaneously, a cam follower/holding pin 212 in the outermost end of arm assembly 172 is released, following the sliding vertical motion of the slide 136. The pin 212 moves to the left (under spring bias not shown), following a cam surface 214 formed in an opening 126 of a folded portion 218 of the slide 136. This movement of the arm assembly 172 causes the wheel 170 to frictionally engage the periphery 178 of the take-up reel 158 to facilitate proper biased loading and storage of tape upon said reel. Under other modes of tape movement (fast forward, fast reverse, or re-wind), the pin 212 is held to the right, thus disengaging the wheel 170.

In FIGS. 1 and 2, I have shown the telephone answering machine in perspective (FIG. 1), and in top plan view (FIG. 2), having the top cover removed for clarity. As indicated, the cassette tape receptacle 52 has a see-through opening 140 revealing the presence of a tape cassette device 94 of the closed loop type. The second tape receptacle 54 also has a see-through opening 142 revealing the presence of the tape cassette device 122 of the reel-to-reel type, positioned immediately below and in vertical alignment with the elements of 52, 140 and 94 above. Located between the tape receptacles 52 and 54 (FIGS. 2 and 3) is the electrical drive motor 86, and immediately below and to the right thereof, is the solenoid 116. Located to the left of motor 86 is the two digit counter 54 which is operated by a solenoid 248 and has a reset button 58. In FIG. 2, the support assemblies 92 and 126 are shown in the non-operative or retracted mode, with their elements in full view for clarity. The receptacles 52 and 54 are partially cut away to reveal the capstans 104 and 138, respectively. Several electronic components are also indicated, such as a monitor switch 72, a power transformer 220 and six multi-contact relays designated by numerals 84, 110, 114, 222, 224 and 80.

Figure 4:
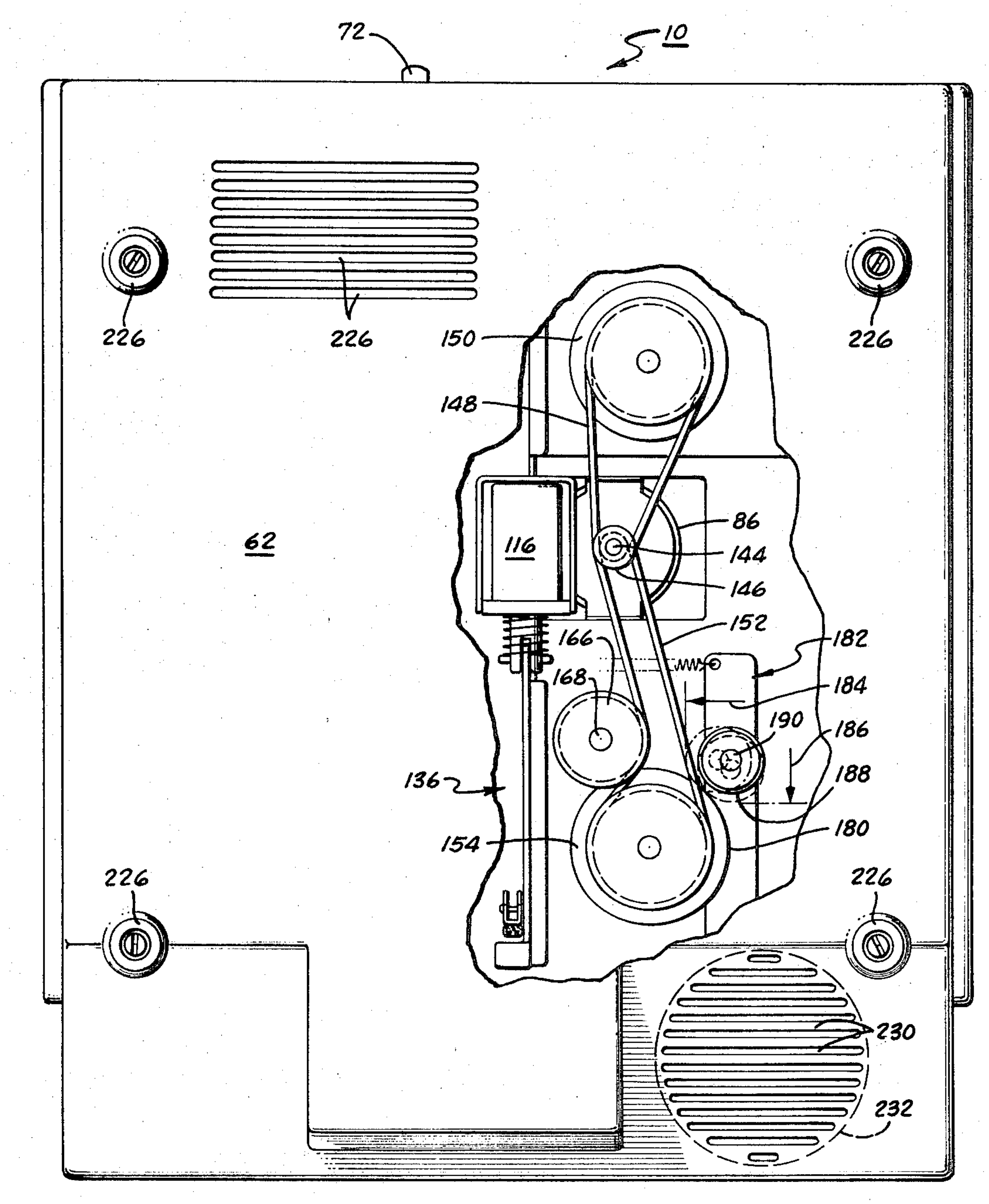
FIG. 4 is a bottom plan view of the machine (viewed as having rotated FIG. 2 180° to the right or left) with the bottom cover housing in place, portions of which are broken away to reveal the electro-mechanical drive system.

FIG. 4 views in plan the bottom case or housing 62 of the machine 10, which is constructed of molded high impact plastic or other suitable material. For convenience and function, four resting feet 226 are formed in the bottom housing 62 and provide recessed mounting bolt holes for the purpose of attaching bottom housing to the machine in general. Further located in the bottom housing 62, is a perforated area 228 for passage of cooling air into the enclosure of the machine proper, immediately under the power transformer 220. Another perforated area 230, provides for the passage of sound projected by a small loud speaker 232 attached immediately thereunder, and indicated by dotted lines.

Figure 5A:
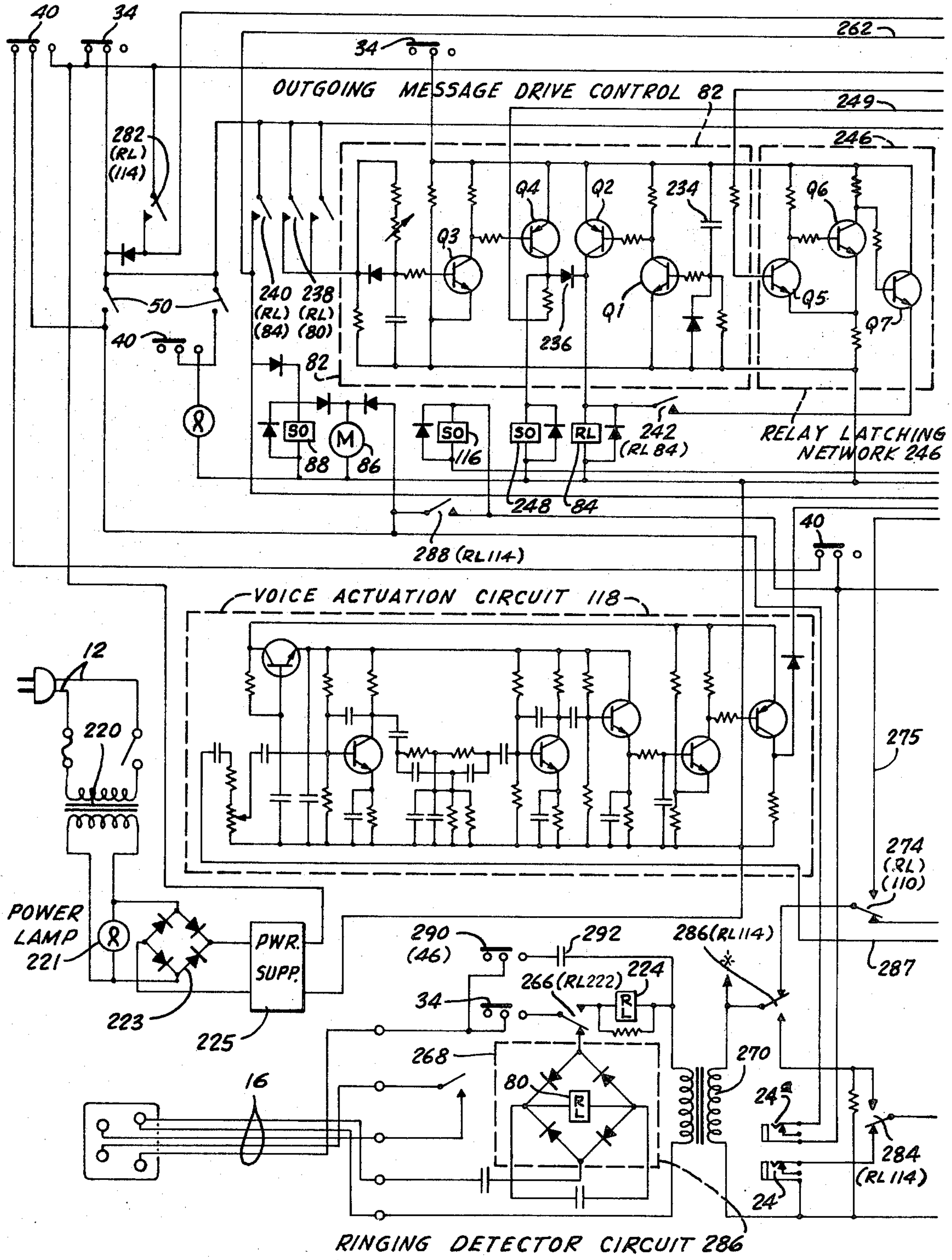
Figure 5B:
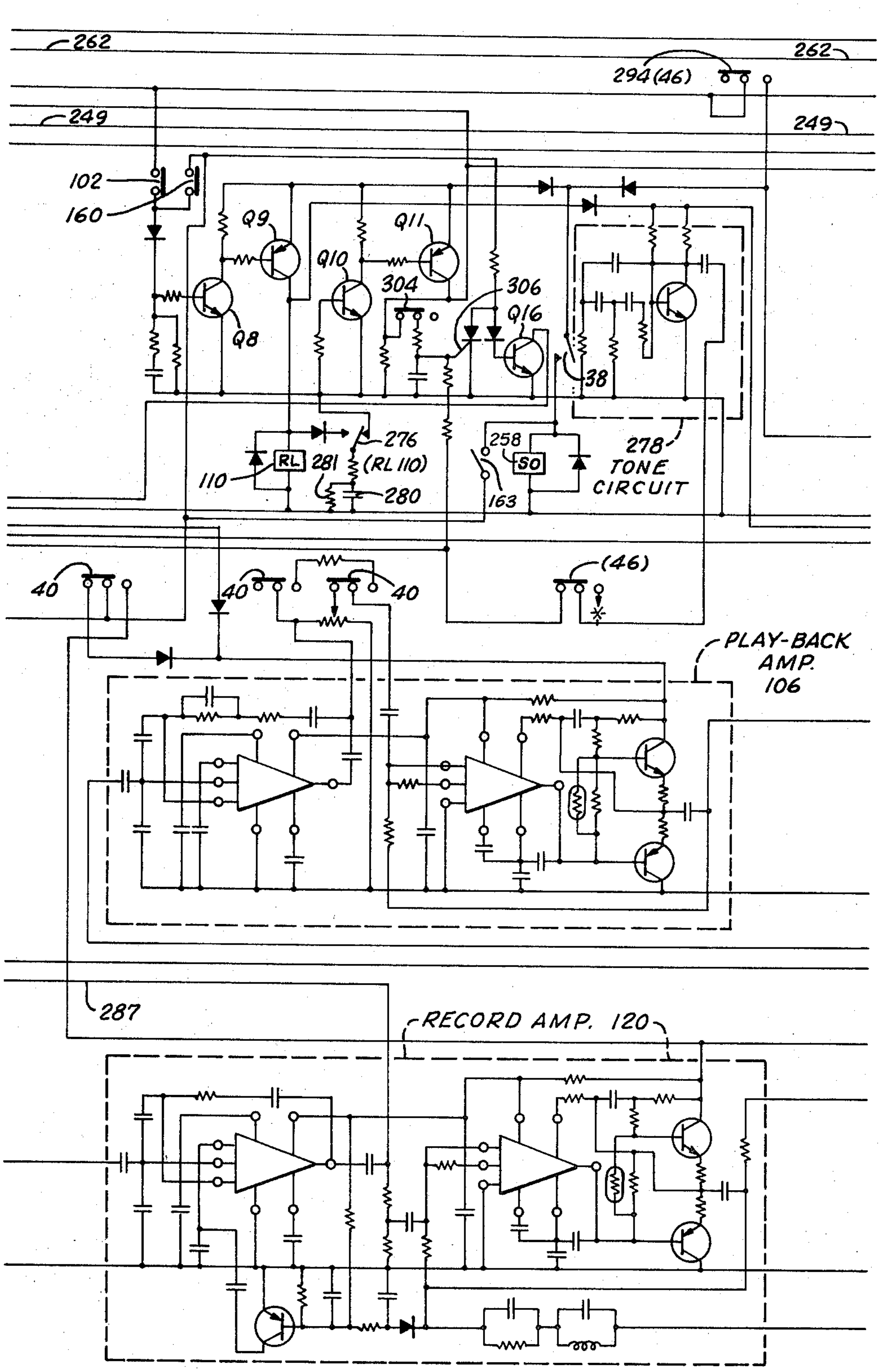
Figure 5C:
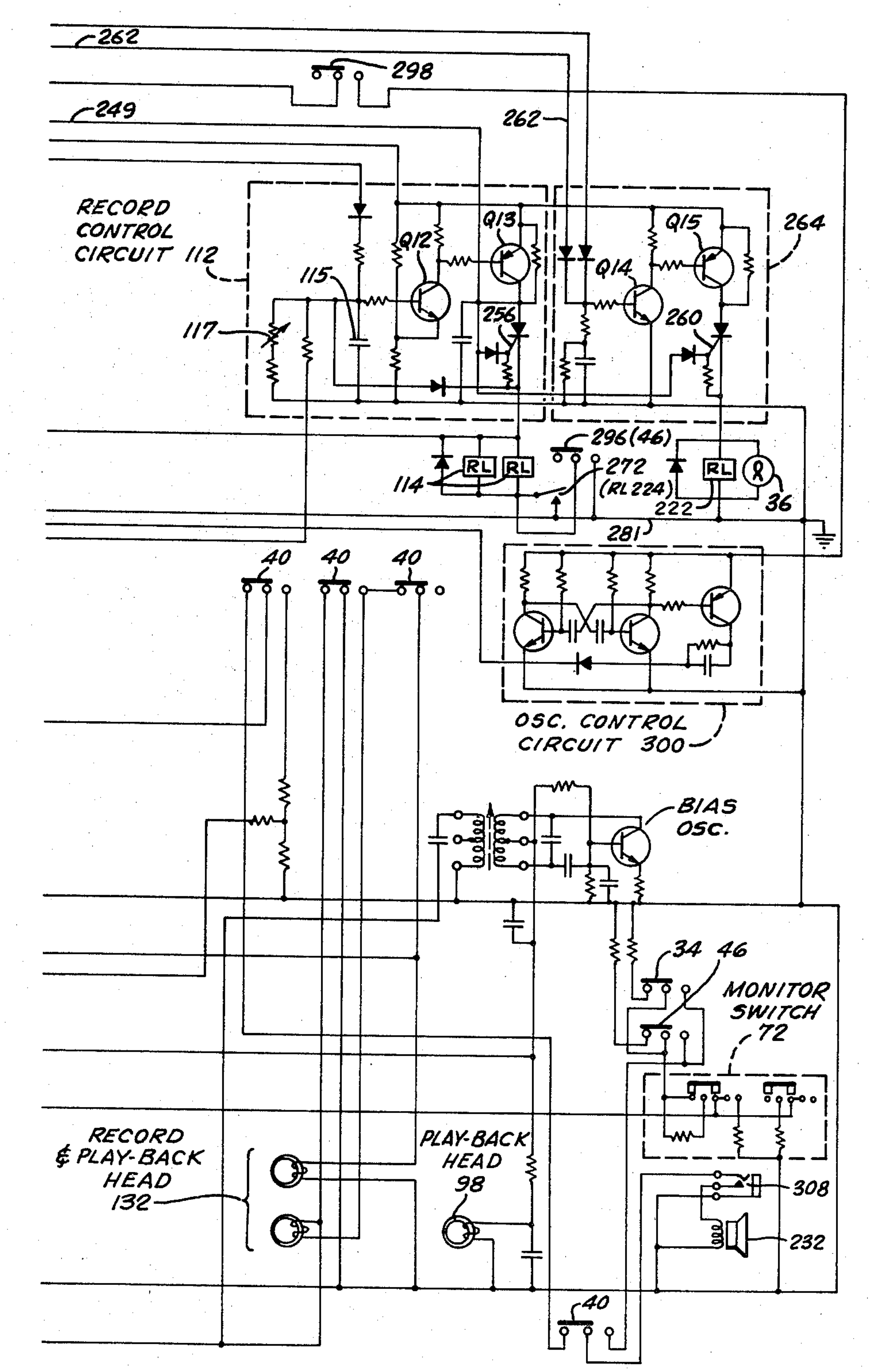

A detailed electrical circuit diagram consisting of FIGS. 5*a*, 5*b* and 5*c* may be referred to in describing the unique functions, logic, and switching controls of the telephone answering machine 10. When these sheets are aligned edgewise in *a*, *b*, *c* order, the adjoining lines represent continuous circuitry lines; some lines are identified with reference numerals to facilitate the alignment and clarify circuit descriptions. It should also be noted in this circuit diagram that certain generally standard components although shown in detail are designated only by a general number and the elements are not described. This has been done to simplify the specification. Relays are designated by the symbol RL and solenoids by the symbol SO. Also, whereas the various relays are shown with their lead connections, the contacts operated by such relays may be shown on a remote portion of the diagram. Thus, below each contact designation the associated relay is shown in parenthesis to help in understanding the circuit. With the machine 10 connected to the standard AC outlet 14, power is supplied to the transformer 220 and thence through an indicator lamp 221, a bridge rectifier 223 to convert from AC to DC power and then to a stabilized power supply device that supplies power to all of the various circuit components.

In the "ready to receive calls" mode, the ready button 34, the record key 40, and the fast forward key 50, are in the "off" position shown. Each time the ready button 34 is depressed, a capacitor 234 in the message drive control circuit 82 will be charged. During the charging period, positive bias is applied to a transistor Q1 of the same circuit, and in sequence a transistor Q2 is biased to conduct and close the relay 84. The outgoing message tape 96 will automatically run one cycle to insure proper indexing and permit a review of its message content. A blocking diode 236 prevents of the functions from occurring during this mode of operation.

On each incoming call, the ringing potential applied to the line causes the relay 80 of the ringing detector circuit 268 to operate and its associated contact 238 closes to apply positive bias to a transistor Q3 which in sequence negatively biases a transistor Q4 to saturation. The resulting current flow closes the relay 84 and its associated contacts 240 and 242 close. Contact 242 latches the relay 84 by means of a relay latching network 246 comprised of a series of transistors Q5, Q6 and Q7. Simultaneously, the condition of transistor Q4 operates the solenoid 248 to advance the message counter 56 by one increment to indicate a message has been recorded. As a part of this same circuit action, conduction of transistor Q4 results in application of a positive voltage (via line 249) to trigger into conduction suitable switch means such as a silicon controlled rectifier 256 of the recorder control circuit 112 and also the SCR 260 of the line seizure circuit. The relay switch contact 240 for relay 84 initiates (via line 262) thE conduction of a transistor Q14 of the line seizure control circuit 264 and in sequence a transistor Q15 at saturation and through the previously triggered silicon controlled rectifier 260 actuates a relay 222 and turns on the indicator lamp 36. The associated contact 266 of relay 222 connects the incoming telephone line 16 to the primary of a transformer 270 to complete the line seizure function and ground the relay 114. Additionally, closure of contact 240 of relay 84 starts the drive motor 86 and operates solenoid 88, causing the magnetic record/play-back head 98 and pinch roller assembly 100 to engage the message tape 96. At this point in the operation sequence, a recorded message is reproduced through the play-back amplifier 106 whose output is coupled to the telephone line through the transformer 270.

The playback amplifier 106 is similar in circuitry to the record amplifier 120. While detailed circuitry of both of these components is shown, the elements are not described since their structure and function may be in accordance with conventional amplifier circuits.

At the conclusion of the outgoing message, a short metallic strip of the endless loop message tape 96 provides completion of a circuit through the sensor 102 which enables a positive bias to be applied to the transistor Q8. The condition of a transistor Q8 biases a transistor Q9 into saturation which actuates the relay 110 and momentarily closes its associated contacts 274 and 276. Contact 274 connects the 1,400 $H_z$ oscillator circuit 278, to the outgoing line 275 for a 1-second period. This is the record go-ahead indication tone heard by the caller. Contact 276 completes the charging circuit for a capacitor 280 whose discharge path is through a resistor 281, providing a conducting bias to a pair of transistors Q10 and Q11 through the transistor Q5 of the message drive control circuit and thereby switching off the transistors Q6 and Q7. This causes the relay 84 to unlatch, breaking its contact 240 and releasing the solenoid 88 to retract the magnetic playback head 98 and pinch-roller assembly 100 and sensor 102 from the message tape 96. Transistor Q11 additionally provides a positive bias to a transistor Q12 which in turn applies a negative bias to a transistor Q13 that conducts at saturation to operate the relay 114. This closes the associated contacts 282 and 288 of relay 114 to retain the applied power to the drive motor 86 and the bias on transistor Q14. Another pair of contacts 284 and 286 of relay 114 also close to provide for a line input from the transformer 270 to the record amplifier 120. The caller can now proceed to state his message which will be instantly recorded on the tape 128 of the second cassette 122.

At the conclusion of the incoming recorded message when the calling party disconnects, a brief interruption in the voltage on the line will cause the relay 224 to open its associated contact 272. This disconnects relay 114 from ground and causes its associated contact 282 to open a current path through a lead 281 to the relay 222, thereby causing it to restore and thereby open its associated contact 286. This disconnects the incoming line from the transformer 270 and connects it to relay 80 of the ringing detection circuit 268. The machine is now re-set for the next incoming call.

The voice actuation circuit (VAC) 1118 is provided to handle a telephone system with a "called party release" feature. Its function may be described as follows: A portion of the signal from the record amplifier 120 is fed by a lead 287 to the VAC 118 through the capacitor 280. The VAC 118, as shown, is preferably an amplifier circuit utilizing transistors, capacitors, resistors and diodes in a conventional manner. A detailed description of these elements has been omitted to conserve space. The VAC 118 amplifies and filters the record amplifier signal to provide an output which is utilized to continue biasing the transistor Q12 to conduct, and in sequence to continue biasing the transistor Q13 to saturation. This signal from the VAC 118, when present, also keeps charged a capacitor 115 in the base network of the transistor Q12. This maintains the continued actuation of the relay 114. When there is no signal coming from the record amplifier 120 for 10 seconds, the capacitor 115 in the base network for the transistor Q12 becomes fully discharged and the transistors Q12 and Q13 in the control circuit will stop conducting and the relay 114 is restored (opened). A variable resistor 117 in the base network for the transistor Q12 enables the time constant for the capacitor 115, as desired, to be increased or decreased.

In the recording cycle, when the end of the metallic strip on the tape 96 of cassette 94 touches the sensor 102, the transistor Q11 conducts to apply positive voltage through a switch 304 to trigger into full conduction a silicon controlled rectifier 306. This brings the base of a transistor Q16 to ground potential, thereby stopping its conduction and removing ground from the solenoid 116. This action releases the pinch-roller assembly 134 and movement of the tape 128 stops. My machine 10 may also be used to record normal phone calls. When the two-way record button 46 is depressed, a switch 290 connects the line to the transformer 270 through a capacitor 292 so that the line is no longer seized by the telephone answering machine 10 but by the telephone 30 instead. A switch 294 for this control button 46 bypasses the normal control sequence to operate the relay 114 and another switch 296 for button 46 connects the other side of relay 114 to the common ground circuit. Another switch 298 for the control button 46 functions to initiate the 15 second interval oscillator circuit 300 which is essentially a flip-flop circuit. This circuit controls the power supply to the 1,400 $H_z$ oscillator 278 periodically to provide the legally required recording tone, which will be introduced to the line at 15 second intervals.

When the three-position monitor switch 72 is in the "on" position, it is possible to monitor the incoming message through the speaker 232 at two fixed volume levels; the second and third positions of the monitor switch 72 control the high or low volume levels. An earphone jack 308 shunts the speaker 232 circuit. This mode of listening may be employed optionally by the user.

For recording a new message on the cassette 94, it is placed in the cassette holder 54 and the microphone cord is inserted in the jacks 24 and **24*a* so as to receive an input from microphone 20. When the microphone switch 26 is "on," the jack 24*a* closes to actuate solenoid 116 and through appropriate linkage applies spring bias to the pinch-roller assembly 134 to start recording on the tape 96**.

From the foregoing it should be apparent that the present invention provides a highly versatile and easy to operate telephone answering machine that will perform a wide variety of functions with efficiency and reliability. The use of separate recording tape cassettes of the standard size commonly used in many recording devices provides for considerable flexibility and ease of operation. The simplicity of setup and connection to conventional telephone facilities overcomes prior installation problems. Moreover, the novel mechanical and electronic arrangements as described provide a unit that is compact and durable.

To those skilled in the art to which this invention relates, many changes in construction and widely differing embodiments and application of the invention will suggest themselves without departing from the spirit and scope of the invention. The disclosures and the description therein are purely illustrative and are not intended to be in any sense limiting.

I claim:

1. An automatic telephone answering machine for use in combination with a conventional telephone set comprising, a casing, a first receptacle in the casing for removably retaining a first magnetic tape cassette having a prerecorded message, a second receptacle in the casing for removably retaining a second magnetic tape cassette for recording a received message from a caller on said telephone, a pair of cooperating tape drive elements within each receptacle for driving the tape comprising, a pinch roller element and a capstan element, one of the drive elements of each pair being operatively connected to be constantly driven by a driving means common to both, the other of the elements of each pair being movably mounted for pressing said tapes into engagement with a respective one of the driven elements to effect feeding movements thereof, means responsive to a received call to said telephone set for moving a first of said other elements to effect feeding movement of the tape in the first cassette, and means responsive to completion of the prerecorded message in the first cassette for moving the second of said drive elements to effect feeding movement of the tape in the second cassette and terminating feeding movement of the tape in the first cassette.

2. An automatic telephone answering machine in accordance with claim 1, including, a movable plate mounted in each receptacle, the other of said pair of drive element each being supported on a respective movable plate which constitutes the movable mounting therefor, a magnetic transducer means and a tape sensing means for controlling tape feeding, supported on each of the plates for concurrent movement into engagement with the tapes when said other one of the pair of drive elements is moved to effect feeding of the tapes.

3. An automatic telephone answering machine according to claim 2 wherein the tape sensing means of the first cassette cooperates with means carried by the tape thereof at the end of the prerecorded message to effect movement of the tape in the second cassette, the tape sensing means of the second cassette being responsive to a predetermined pressure of the tape thereon for terminating operation of the driving means.

4. An automatic telephone answering machine according to claim 3 wherein the magnetic transducer means in the first receptacle is a playback head, the transducer means in the second receptacle includes a recording head, said second receptacle providing means for receiving and removably retaining the first cassette therein for cooperation of the tape therein with said recording head, and manually operable control means for effecting feeding of the tape of the first cassette by the drive elements in the second receptacle when the first cassette is located therein, and for causing energization of the recording head to record a message on the tape of the first cassette.

* * * * *